April 20, 1937.  H. A. ELLIOTT  2,077,993
PRETZEL MAKING MACHINE
Filed June 11, 1934   2 Sheets-Sheet 1

Inventor
Harry A. Elliott
by Orwig & Hague Attys

April 20, 1937. H. A. ELLIOTT 2,077,993
PRETZEL MAKING MACHINE
Filed June 11, 1934  2 Sheets-Sheet 2
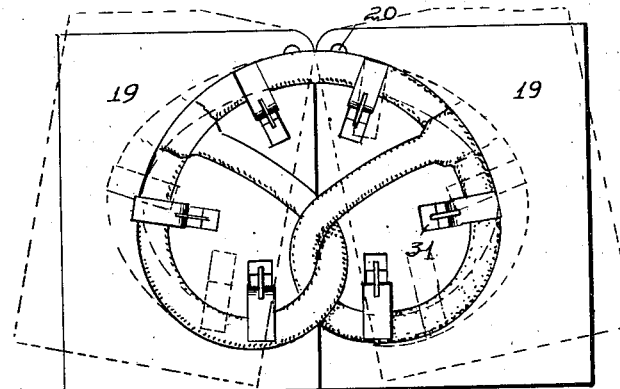
Fig.2.
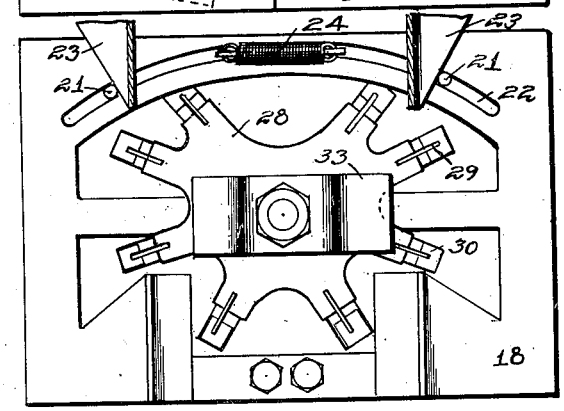
Fig.3.
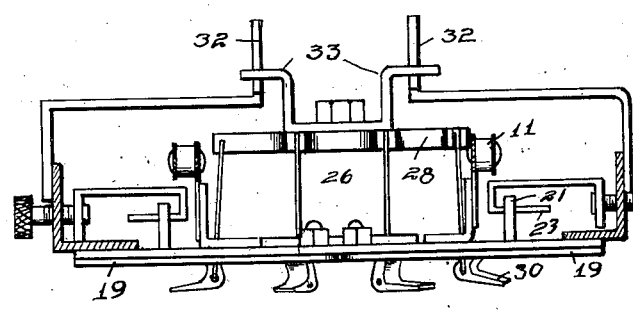
Fig.4.
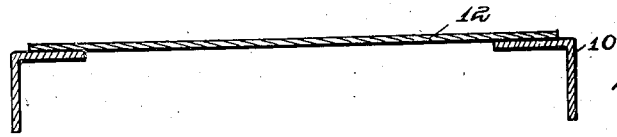
Inventor
Harry A. Elliott
by Owing & Hague Attys Patented Apr. 20, 1937

2,077,993

UNITED STATES PATENT OFFICE 2,077,993

PRETZEL MAKING MACHINE

Harry A. Elliott, Jefferson, Iowa

Application June 11, 1934, Serial No. 729,997

10 Claims. (Cl. 107—8)

In the art of pretzel making by machinery I have demonstrated that it is important that the end portions of a stick of dough be twisted together with a certain degree of tightness so that when the pretzel is formed it may be put through the various processes, now commonly employed, without separating at the twisted portion. When the twist is not tight enough, then during the processing and baking of the pretzel the twisted portion will separate, and this results in a completed pretzel in which the breakage, due to shipment and handling, is excessively great. But, if the twisted portion is subjected, during the forming of the pretzel, to the proper degree of tension at the twist, then the processing and baking operations will not separate the twisted portions, and they will mutually brace and support each other at the twisted part with the result that the completed pretzel will be relatively strong and will withstand the customary amount of handling and shipping without breakage.

The object of my invention is to provide a machine of simple, durable and inexpensive construction for automatically tightening the twist in a pretzel being formed, and, further, in providing means for tightening the twist at the proper time during the operation of forming the pretzel, so that the stick of dough will not be broken or subjected to undue strains during the pretzel forming process, and at the same time the formed pretzel will have its twisted portion under tension tending to hold the parts of the twisted portion firmly together.

My invention consists in the construction, arrangement and combination of the various parts of the device, whereby the objects contemplated are attained, as hereinafter more fully set forth, pointed out in my claims, and illustrated in the accompanying drawings, in which:

Figure 2 shows a top or plan view illustrating the hinged plates on which the pretzel is formed, and the fingers thereon for holding the pretzel in shape while being formed, and by dotted lines, showing the plates spread apart.

Figure 3 shows an inverted plan view of the travelling support for the pretzel being formed and illustrating the cam guides for moving the pretzel supporting plates outwardly relative to each other.

Figure 4 shows a vertical transverse sectional view through a portion of the pretzel making machine, including the frame and the conveyor for carrying off the pretzels after they have been discharged from the pretzel forming plates, and illustrating the pretzel forming support and fingers and the means for operating the same.

Figure 5:
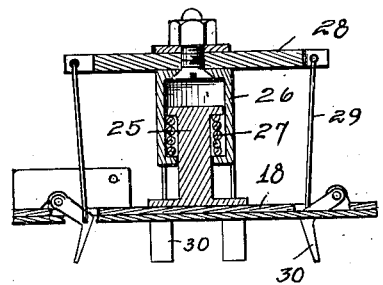
Figure 5 shows a detail vertical sectional view illustrating the automatic finger operating mechanism.
Figure 6:
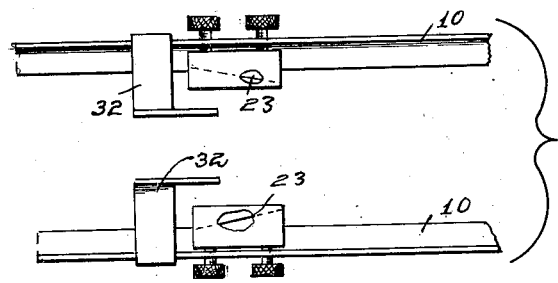
Figure 6 shows a detail plan view illustrating a part of the machine frame with the cam guides thereon for supporting the pretzel forming plates and withdrawing the pretzel engaging fingers.

In the accompanying drawings I have used the reference numeral 10 to indicate generally the machine frame. Mounted on the machine frame is a travelling conveyor 11, and below this conveyor is a second travelling conveyor 12 to receive the pretzels after they have been formed and discharged from the pretzel engaging fingers.

Slidingly mounted on the machine frame above the upper portion of the conveyor 11 is a pretzel forming mechanism indicated generally by the reference numeral 13. This pretzel forming mechanism forms no part of my present invention and is fully illustrated and described in my co-pending application No. 709,752, filed February 5, 1934.

In the present illustration I have shown as a means for operating the pretzel forming device, a cam 14 to engage a roller 15, carried by a lever 16, and connected by an arm 17 with the pretzel forming device 13.

Mounted on the conveyor 11 is a series of pretzel forming supports, one of which is herein illustrated. The body of the support, clearly illustrated in Figure 3, is indicated generally by the reference numeral 18. When this support is in its position for use in forming a pretzel there is pivoted to its top surface two pretzel forming plates 19, connected with pivot pins 20, so that the free ends of these plates may swing toward and from each other. Each of these plates is provided with a pin 21 extended through a curved slot 22 in the support 18.

Fixed to the machine frame are two cams 23 in position to be engaged by the pins 21, and as the pretzel forming support is advanced these cams will force the free ends of the plates 19 outwardly away from each other. A spring 24 is connected to both of the plates 19 for normally returning them to their edge to edge position, as shown in Figure 2.

Fixed to the central portion of the support 18, and projected upwardly therefrom, when in the position shown in Figure 5, is a guide device 25 slidingly mounted in a cylinder 26, and a spring 27 is arranged between the guide device and the cylinder for yieldingly holding the cylinder at its limit of movement toward the support 18.

Fixed to this cylinder is a yoke 28 to which a series of links 29 are pivoted.

Pivotally mounted on the support 18 is a series of pretzel engaging fingers 30 which project through slots 31 in the plates 19, and the links 29 are pivoted to these fingers.

These fingers, as will be seen in Figure 2, are so positioned that they will project upwardly and then outwardly through the slots in the plates 19 and will engage the inner surfaces of the loop of a pretzel being formed, on the plates 19, to thereby limit the inward movement of said loop. These fingers also project over the top surface of the pretzel being formed, so that when the pretzel forming plate is moved to an inverted position, as when travelling over the lower portion of the conveyor 11, said fingers will hold the pretzel from dropping off of the conveyor.

Figure 1:
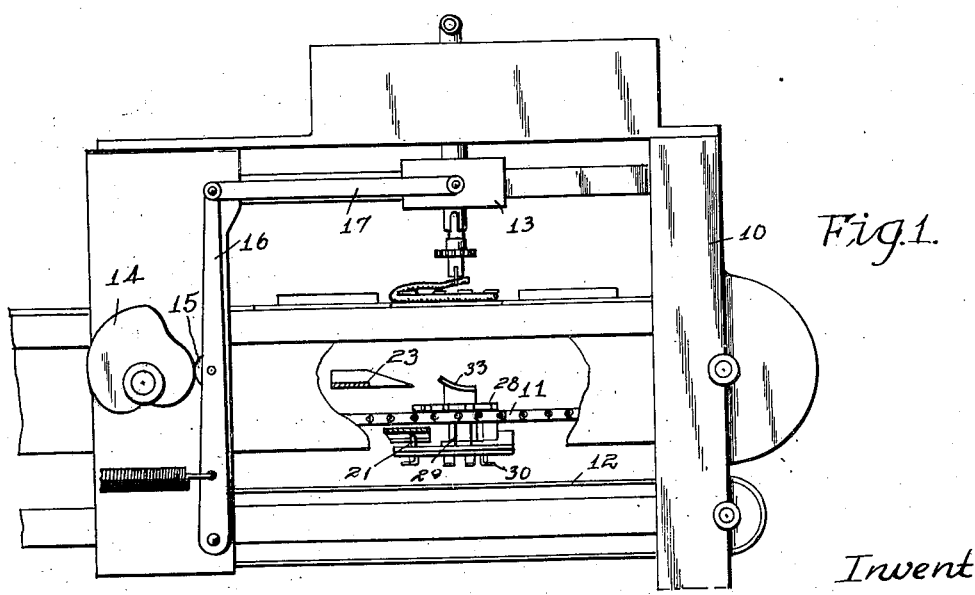
Figure 1 shows a side elevation of a portion of a pretzel making machine having my improvement applied thereto and the parts broken away to show certain structural details.

After the pretzel has been formed to the position shown in Figure 2, with the fingers 30 engaging the inner surface of the pretzel loop, I have provided for applying a predetermined amount of tension to the twisted portion of a pretzel as follows:

The cams 23 are so positioned with relation to the frame, as shown in Figure 1, that when the pretzel has been completely formed and is in its inverted position ready to drop upon the conveyor 12, these cams 23 will engage the pins 21 and force the free ends of the plates 19 outwardly away from each other to a pre-determined distance necessary to apply such tension to the twisted portion of the pretzel as is desirable and necessary to provide a firm twist without danger of subjecting the stick of dough at the twisted portion to undue strains and stresses.

In practice with my improved device I have demonstrated that with this construction a desired tightness of the twist may be obtained.

For the purpose of releasing the fingers 30 from engagement with the pretzel, so that the pretzel may drop upon the conveyor 12, I have provided a cam device 32 fixed to the machine frame and in position to be engaged by the arms 33, carried by the yoke 28. With this construction, when the arms 33 engage the cams 32 the yoke 28 will be moved away from the support 18, thereby swinging the arms 30 to their withdrawn position and permitting the pretzel to drop by gravity upon the conveyor 12.

It is obvious that my improved twist tightening device may be employed on pretzel making machines of many different forms. It is also obvious that various structures may be employed for moving the pretzel engaging fingers outwardly to provide additional twist to the twisted portion of the pretzel being formed, and I do not desire to be understood as limiting myself to the particular structures hereinbefore described.

I have discovered in practice that, with my improved device and when a pretzel has been completely formed and the pretzel forming plates 19 moved as herein described, then the twisted portion of the pretzel is twisted tightly together and the dough has been slightly stretched or placed under tension, and that the elasticity of the dough tending to return it to its normal position after being stretched, serves to maintain the twist in its tightened condition during its passage through the various processes and baking now commonly employed in the making of pretzels.

In the accompanying claims I have referred to the inner surface of a pretzel loop, and by that I mean to distinguish from what might be termed the outer surface or periphery of the pretzel loop, and by outward movement of the pretzel engaging fingers I mean outwardly from the center of the pretzel loop.

I claim as my invention:

1. In a pretzel making machine, the combination of a support for a stick of dough while being bent into the form of a pretzel, a finger projecting from the support to position for engaging the inner surface of a pretzel loop on one side of the twisted portion of the pretzel, and a finger projecting from the support to position for engaging the inner surface of a pretzel loop on an opposite side of the twisted portion of a pretzel, and means for moving one of said fingers outwardly relative to the other for tightening the twisted portion of a pretzel.

2. In a pretzel making machine, the combination of a support for a stick of dough while being bent into the form of a pretzel, a finger projecting from the support to position for engaging the inner surface of a pretzel loop on one side of the twisted portion of the pretzel being formed, and a finger projecting from the support to position for engaging the inner surface of a pretzel loop on an opposite side of the twisted portion of a pretzel being formed, and means for moving said fingers outwardly away from each other for the purposes stated.

3. In a pretzel making machine, the combination of a support to receive a pretzel being formed, a portion of said support being movable outwardly away from the remaining portion, fingers associated with both portions of the support shaped and positioned to engage the inner surface of a pretzel loop on the support, means for moving the movable portion of the support outwardly away from the remaining portion thereof, and means for withdrawing said fingers through the support from engagement with the loop of a pretzel on the support.

4. In a pretzel making machine, the combination of a support to receive a pretzel being formed, a portion of said support being movable outwardly away from the remaining portion, fingers associated with both portions of the support shaped and positioned to engage the inner surface of a pretzel loop on the support, means for moving the movable portion of the support outwardly away from the remaining portion thereof, means for withdrawing said fingers through the support from engagement with the loop of a pretzel on the support, and means for returning said movable member of the support to its position adjacent the other member.

5. In a pretzel making machine, the combination of a support to receive a pretzel being formed, a portion of said support being movable outwardly away from the remaining portion, fingers associated with both portions of the support shaped and positioned to engage the inner surface of a pretzel loop on the support, means for moving the movable portion of the support outwardly away from the remaining portion thereof, means for withdrawing said fingers through the support from engagement with the loop of a pretzel on the support, means for returning said movable member of the support to its position adjacent the other member, and means for returning said fingers to their first mentioned position.

6. In a pretzel making machine, the combination of a travelling conveyor, a support carried by the conveyor to receive and support a pretzel being formed, fingers associated with said support and positioned to engage the inner surface of a pretzel loop on the support, and means arranged in the path of travel of said support for moving said fingers outwardly away from each other for the purposes stated.

7. In a pretzel making machine, the combination of a support for a pretzel being formed, said support comprising two plates pivotally supported to swing outwardly away from each other, and fingers carried by said plates and shaped to engage the inner surfaces of a pretzel on said support, and means for swinging said plates outwardly away from each other.

8. In a pretzel making machine, the combination of a support for a pretzel being formed, said support comprising two plates pivotally supported to swing outwardly away from each other, and fingers carried by said plates and shaped to engage the inner surfaces of a pretzel on said support, means for swinging said plates outwardly away from each other, and a spring for normally returning said plates to their first mentioned position.

9. In a pretzel making machine, a travelling conveyor, a support carried by the conveyor, two plates pivotally connected with said support, fingers carried by said plates shaped to engage the inner surface of a pretzel loop carried by the plates, and a cam device arranged in the path of travel of said support positioned to be engaged by said plates during their travel, said cam being shaped to move said plates away from each other.

10. In a pretzel making machine, a travelling conveyor, a support carried by the conveyor, two plates pivotally connected with said support, fingers carried by said plates shaped to engage the inner surface of a pretzel loop carried by the plates, and a cam device arranged in the path of travel of said support positioned to be engaged by said plates during their travel, said cam being shaped to move said plates away from each other, and a second cam device arranged in the path of travel of the support for engaging said fingers and moving them to position out of contact with a pretzel loop on the plates.

HARRY A. ELLIOTT.